United States Patent [19]

Eadara

[11] Patent Number: 5,198,065
[45] Date of Patent: Mar. 30, 1993

[54] METHOD FOR BONDING STEEL TO WOOD USING AN EPOXY PRIMER AND ADHESIVE

[75] Inventor: Rajan Eadara, East Lansing, Mich.

[73] Assignee: Ciba-Geigy Corporation, Ardsley, N.Y.

[21] Appl. No.: 660,510

[22] Filed: Feb. 25, 1991

[51] Int. Cl.$^5$ .................................................. C09J 5/04
[52] U.S. Cl. ..................................... 156/315; 428/464; 523/428; 523/433; 528/27; 528/103; 528/113
[58] Field of Search .................. 528/27, 103, 113; 523/428, 433; 525/113; 156/315; 428/464

[56]         References Cited
        U.S. PATENT DOCUMENTS

| | | | |
|---|---|---|---|
| 3,787,452 | 1/1974 | Leumann | 528/27 |
| 3,867,322 | 2/1975 | Leumann | 528/27 |
| 4,574,132 | 3/1986 | Sayles | 528/103 |
| 4,619,949 | 10/1986 | Kistner | 528/27 |
| 4,772,645 | 9/1988 | Tarbutton et al. | 528/103 |
| 4,954,580 | 9/1990 | Zahir | 528/27 |
| 5,073,434 | 12/1991 | Frank et al. | 428/195 |

FOREIGN PATENT DOCUMENTS 55-025432  2/1980  Japan ........................ 528/27

*Primary Examiner*—John C. Bleutge
*Assistant Examiner*—D. E. Anylward
*Attorney, Agent, or Firm*—JoAnn Villamizar

[57]             ABSTRACT

The present invention relates to a creosote resistant epoxy adhesive system comprising
(A) a low viscosity primer comprising
   (a) a resin component comprising diglycidyl ether of Bisphenol A, diglycidyl ether of butanediol, and epoxy silane; and
   (b) a hardener component comprising an aliphatic amine; and
(B) an adhesive component comprising
   (a) a resin component comprising diglycidyl ether of Bisphenol A, a diluent, a filler, and epoxy silane; and
   (b) a hardener component comprising a combination of (i) an aliphatic or aromatic amine and (ii) a polyamide or an adducted amine with diglycidyl ether of Bisphenol, and a filler and wherein a flexibilizer is present in either component (a) or component (b) of said adhesive component.

19 Claims, No Drawings

METHOD FOR BONDING STEEL TO WOOD USING AN EPOXY PRIMER AND ADHESIVE

BACKGROUND TO THE INVENTION

Bonding dried wood to steel with an epoxy adhesive is not problematic. Difficulties arise when the wood is moist and acidic. Furthermore, in the manufacture of railroad ties the epoxy adhesive must be resistant to creosote for prolonged time periods at high temperature and pressure as the railroad ties are manufactured by first bonding the steel components to the wood and then subjected to the creosote treatment at about 200 psi and about 200° F. (90° C.) for a period of about 6 to 8 hours.

Accordingly, it is an object of the present invention to provide an epoxy adhesive system for bonding steel to moist, acidic wood.

It is a further object of the present invention to provide an epoxy adhesive system for bonding steel to wood which is resistant to creosote treatment.

Further objects and advantages of this invention will become apparent from the following descriptive material and illustrative examples.

SUMMARY OF THE INVENTION

The present invention relates to an epoxy adhesive system for bonding steel to wood which is resistant to creosote comprising a low viscosity primer component and an adhesive component.

DETAILED DESCRIPTION OF THE INVENTION

The present invention relates to a creosote resistant epoxy adhesive system comprising
(A) a low viscosity primer comprising
  (a) a resin component comprising diglycidyl ether of Bisphenol A, diglycidyl ether of butanediol, and epoxy silane; and
  (b) a hardener component comprising an aliphatic amine; and
(B) an adhesive component comprising
  (a) a resin component comprising diglycidyl ether of Bisphenol A, a diluent, a filler, and epoxy silane; and
  (b) a hardener component comprising a combination of (i) an aliphatic or aromatic amine and (ii) a polyamide or an adducted amine with diglycidyl ether of Bisphenol, and a filler
and wherein a flexibilizer is present in either component (a) or component (b) of said adhesive component.

(A) The Low Viscosity Primer

The resin component comprises diglycidyl ether of Bisphenol A, diglycidyl ether of butanediol and epoxy silane. The diglycidyl ether of Bisphenol A is present in a range of from 60 to about 80 wt %, preferably about 65 to about 70 wt %, most preferably 68 wt % based upon the total weight of the resin component.

The diglycidyl ether of butanediol is employed as a diluent in such amount so as to provide the resin component with a viscosity of about 400 cps and is present in a range of from 10 to about 40 wt %, preferably about 25 to about 35 wt %, most preferably 29 wt % based upon the total weight of the resin component.

The epoxy silane is an adhesion promoter which provides the cured adhesive resistance to moisture and is present in a range of from 0.5 to about 5 wt %, preferably about 1 to about 4 wt %, most preferably 3 wt % based upon the total weight of the resin component.

The hardener component comprises an aliphatic amine. Suitable aliphatic amines for the hardener component of the low viscosity primer include 2,2,4-trimethylhexanediamine, 2,4,4-trimethylhexanediamine, 2-methylpentanediamine, monoethanolamine, N-aminoethyl ethanolamine, ethylenediamine, hexamethylenediamine, trimethylhexamethylenediamine, diethylenetriamine, triethylenetetramine, tetraethylenepentamine, N,N-dimethylpropylenediamine and 1,3-N,N-diethylpropylenediamine. The preferred amines are 2,2,4-trimethylhexanediamine and 2,4,4-trimethylhexanediamine.

The hardener component is present in a stoichiometric ratio with regard to the resin component.

(B) The Adhesive Component

The resin component comprises diglycidyl ether of Bisphenol A, a diluent, a filler, epoxy silane and a flexibilizer if such is not present in the hardener component.

The diglycidyl ether of Bisphenol A is present in a range of from 40 to about 60 wt %, preferably about 45 to about 55 wt %, most preferably 50 wt % based upon the total weight of the resin component.

The diluent is present in order to adjust the viscosity of the resin component to about 10–20,000 cps. Suitable diluents include tripropylene glycol monomethyl ether, glycidyl ether of butanediol, glycidyl ether of o-cresol, butyl glycidyl ether, $C_{12}$ and $C_{14}$ aliphatic alkyl glycidyl ether, $C_8$ and $C_{10}$ alkyl glycidyl ether and the like. Preferably, tripropylene glycol monoethyl ether or glycidyl ether of butanediol are employed. The diluent is present in a range of from 4 to about 10 wt %, preferably about 5 to about 8 wt %, most preferably 6 wt % based upon the total weight of the resin component.

The filler is employed to minimize shrinkage of the adhesive after cure. Suitable fillers include silica, talc, kaolin, aluminum oxide and the like. Preferably, silica is used, most preferably, silica of 10–25 micron size. The filler is present in a range of from 25 to about 40 wt %, preferably about 30 to about 35 wt %, most preferably 37 wt % based upon the total weight of the resin component.

The epoxy silane is an adhesion promoter which provides the cured adhesive resistance to moisture. The epoxy silane is present in a range of from 0.5 to about 3 wt %, preferably about 1 to about 2 wt %, most preferably 2 wt % based upon the total weight of the resin component.

Suitable flexibilizers for use in the resin component include epoxy terminated polysulfide, adduct of diglycidyl ether of Bisphenol A with carboxyl terminated synthetic rubber, epoxy terminated polyurethanes and the like. The epoxy terminated polysulfide is preferred. The flexibilizer, when not present in the hardener component, is present in a range of from 3 to about 6 wt %, preferably about 4 to about 5 wt %, most preferably 5 wt % based upon the total weight of the resin component.

The resin component may further comprise additional multifunctional epoxides which can be selected from a broad range of aliphatic and aromatic epoxies having a functionality of at least two and comprises one or more epoxy resins selected from the group consisting of epoxy phenol novolacs, epoxy cresol novolacs, trimethylolpropane triglycidyl ether, triglycidyl para-amino phenol, triglycidyl tris(p-hydroxyphenyl)methane, tetraglycidyl-1,1,2,2-tetrakis(p-hydroxyphenyl)ethane, vinyl cyclohexene dioxide, N,N,N¹,N¹-tetraglycidyl-4,4'-methylene-bis-benzeneamine, N,N,N¹,N¹-tetraglycidyl metaxylene diamine, diglycidyl aniline, resorcinol diglycidyl ether, the diglycidyl ethers of catechol, hydroquinone, and the like, diglycidyl ortho-toluidine, diglycidyl isophthalate, bisphenols F and S epoxy resins, triglycidyl isocyanurate, epoxidized hydantoin resin, and N,N,N¹,N¹-tetraglycidyl-1,3-bis-amino-methylcyclohexane. The various ethers may be substituted on the respective phenyl rings by such non-reactive substituents such as alkyl, halogen, and the like.

Preferred components correspond to

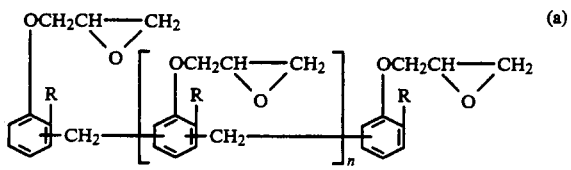

wherein R is hydrogen or methyl, and n is 0.2–3.4. These components are exemplified by the epoxidation products of cresol novolacs and phenol novolacs of varying molecular weight. The preparation of such materials is well-known in the art.

(b) diglycidyl ethers of bisphenols corresponding to the formula

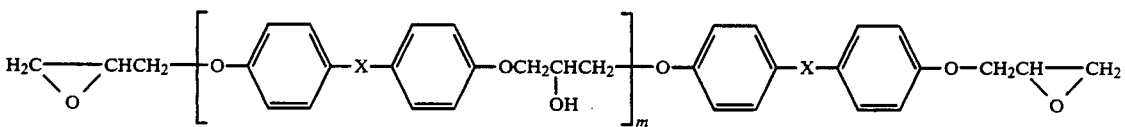

wherein m is 0–50 and X is —CH$_2$—,

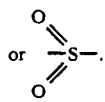

These represent, respectively, bisphenols F and S.

The additional multifunctional epoxide resins can be used in an amount ranging from about 10 to about 30 wt %, preferably about 10 to about 20 wt %, most preferably 14 wt % based upon the total weight of the resin component.

The hardener component comprises a combination of (i) at least one amine with a polyamide or (ii) an adducted amine with diglycidyl ether of Bisphenol, a filler and a flexibilizer when such is not included in the resin component.

As suitable amines, there may be mentioned aliphatic, cycloaliphatic or aromatic primary and secondary amines. Typical amines include 2-methylpentanediamine, 1,3-benzene dimethanamine, 2,2,4-trimethylhexanediamine, 2,4,4-trimethylhexanediamine, dimethanaminemonoethanolamine, N-aminoethyl ethanolamine, ethylenediamine, hexamethylenediamine, trimethylhexamethylenediamine, diethylenetriamine, triethylenetetramine, tetraethylenepentamine, N,N-dimethylpropylenediamine-1,3,N,N-diethylpropylenediamine-1,3,bis(4-amino-3-methylcyclohexyl)methane, bis(p-aminocyclohexyl)methane, 2,2-bis(4-aminocyclohexyl)propane, 3,5,5-trimethyl-s-(aminomethyl)-cyclohexylamine, N-aminoethyl-piperazine, m-phenylene-diamine, p-phenylenediamine, bis(p-aminophenyl)methane, bis(p-aminophenyl)-sulfone, m-xylylenediamine, toluene diamine, 1,2-diaminocyclohexane, 1,4-diaminocyclohexane, 1,3-bis(aminomethyl)cyclohexane, 1,4-bis-(aminomethyl)cyclohexane, isophorone diamine and 1-methyl-imidazole. Preferred amines are 2-methylpentanediamine, triethylenetetramine, 1,3-benzene dimethanamine 2,2,4-trimethylhexanediamine and 2,4,4-trimethylhexanediamine.

As suitable adducted amines with diglycidyl ether of bisphenol, the foregoing amines are suitable. Particularly preferred is 1,3-benzene dimethanamine polymer with diglycidyl ether of Bisphenol A and 2,2,4-trimethylhexanediamine and 2,4,4-trimethylhexanediamine. Bisphenol A, F or S can be used, preferably Bisphenol A is used.

The particularly preferred combinations of amines with a polyamide or an adducted amine with diglycidyl ether of bisphenol are 2-methylpentanediamine and VERSAMID 140® polyamide; and triethylenetetramine, 1,3-benzene dimethanamine and 1,3-benzene dimethanamine polymer with diglycidyl ether of Bisphenol A and 2,2,4-trimethylhexanediamine and 2,4,4-trimethylhexanediamine.

The combination of the amines the polyamide or adducted amine with diglycidyl ether of bisphenol A is present in a range of from 30 to about 65 wt %, preferably about 35 to about 50 wt %, most preferably 36 wt % based upon the total weight of the hardener component.

The filler is employed to minimize shrinkage of the adhesive after cure. Suitable fillers include silica, talc, kaolin, aluminum oxide and the like. Preferably, silica is used, most preferably, silica of 10–25 micron size. The filler is present in a range of from 30 to about 70 wt %, preferably about 50 to about 65 wt %, most preferably 64 wt % based upon the total weight of the hardener component.

Suitable flexibilizers for use in the hardener component include amine terminated synthetic rubber, polysulfides, and the like. The amine terminated synthetic rubber is preferred. The flexibilizer, when not present in the resin component, is present in a range of from 10 to about 20 wt %, preferably about 15 to about 20 wt %, most preferably 15 wt % based upon the total weight of the adhesive component.

The mix ratio of the resin component to the hardener component is about 100 to about 25 by weight, preferably about 100 to about 50 by weight, most preferably, about 100 to about 50 by weight, whereas the mix ratio can be varied if necessary by appropriate variations in filler amounts in the resin and hardener components.

A vertical type high-speed agitator, kneading machine, roll machine, ball mill or any other suitable mixing and agitating machine may be used for dispersion of the components of the composition of the present invention.

The present invention further relates to a method for bonding steel to wood comprising (a) admixing the resin and hardener component of the primer component as set forth hereinabove;
(b) pretreating the wood by applying the primer component thereto;
(c) admixing the resin and hardener component of the adhesive component as set forth hereinabove;
(d) applying the adhesive component to said pretreated wood;
(e) adhering said steel to said wood; and
(f) curing said adhesive at room temperature.

The method is particularly suitable for bonding steel to moist and/or acidic wood, specifically, red or white oak.

The creosote resistant epoxy adhesive system of the present invention are particularly useful for the preparation of railroad ties wherein the primer can penetrate effectively in the wood pores even when the wood is moist and acidic and the hardener ratio can be adjusted so as to neutralize the acidity of the wood surface with excess amine. Such a determination of the hardener ratio is well within the skill of the art. The adhesive and bond strength of the creosote resistant epoxy adhesive system of the present invention are unaffected when subjected to creosote treatment at 200 psi and 200° F. for about 6 to 8 hours.

The following examples serve to give specific illustrations of the practice of this invention but they are not intended in any way to limit the scope of this invention.

EXAMPLE 1

The primer component is prepared by admixing the ingredients for the resin component in the following proportions:

| Primer Component | Pbw |
| --- | --- |
| Resin: | |
| Araldite 6010 | 68 |
| (Diglycidyl ether of Bisphenol A) | |
| DY 026 | 29 |
| (Diglycidyl ether of butanediol) | |
| Silane A 187 (Epoxy silane) | 3 |
| | 100 |
| Hardener: 2,2,4 and 2,4,4 Trimethyl hexane diamine | |
| Mix Ratio: Resin/Hardener 100/35 by wt. | |

EXAMPLE 2

The adhesive component is prepared by admixing the ingredients in the following proportions:

| | Pbw |
| --- | --- |
| Resin: | |
| Diglycidyl ether of Bisphenol A | 50 |
| Epoxy terminated polysulfide | 5 |
| Tripropylene glycol monomethyl ether | 6 |
| Silica (10–25μ) | 37 |
| Epoxy silane | 2 |
| | 100 |
| Hardener: | |
| 2-methyl pentane diamine | 15 |
| Polyamide (Versamid ® 140) | 21 |
| Silica (10–25μ) | 64 |
| | 100 |
| Mix Ratio: Resin/Hardener 100/50 by wt. | |

EXAMPLE 3

The adhesive component is prepared by admixing the ingredients in the following proportions:

| | Pbw |
| --- | --- |
| Resin: | |
| Diglycidyl ether of Bisphenol A | 52 |
| Tripropylene glycol monomethyl ether | 6 |
| Silica (10–25μ) | 39 |
| Epoxy silane | 3 |
| | 100 |
| Hardener: | |
| 2-methyl pentane diamine | 12 |
| Polyamide (Versamid ® 140) | 17 |
| Amine terminated synthetic rubber | 20 |
| Silica (10–25μ) | 51 |
| | 100 |
| Mix Ratio: Resin/Hardener 100/50 by wt. | |

EXAMPLE 4

The adhesive component is prepared by admixing the ingredients in the following proportions:

| | Pbw |
| --- | --- |
| Resin: | |
| Digylcidyl ether of phenol-formaldehyde polymer | 14 |
| Diglycidyl ether of Bisphenol A | 37 |
| Glycidyl ether of Butanediol | 6 |
| Epoxy silane | 2 |
| Silica (10–25μ) | 41 |
| | 100 |
| Hardener: | |
| Triethylene tetramine | 18 |
| 1,3-Benzene dimethanamine | 4 |
| 1,3-Benzene dimethanamine polymer with diglycidyl ether of Bisphenol A and 2,2,4 and 2,4,4 trimethyl hexane diamine | 12 |
| Amine terminated synthetic rubber | 28 |
| Amino silane | 1 |
| Silica (10–25μ) | 37 |
| | 100 |
| Mix Ratio: Resin/Hardener 100/25 by wt. | |

EXAMPLE 5

The adhesive strength of the creosote resistant epoxy adhesive systems of the present invention is determined using an Instron Model 1114 by bonding ⅝" (1.59 cm) diameter steel rods into a 43/64" (1.71 cm) diameter, 2" (5.1 cm) deep hole drilled into a red or white oak block (3"×3"×4"; 7.62 cm×7.62 cm×10.16 cm). The bonding area is primed before the adhesive is applied as follows: The resin and hardener components of the primer component of Example 1 are admixed and applied to red or white oak with a moisture content as set forth in Table 1. The primer is allowed to dry for 5 to 30 minutes. Thereafter, the resin and hardener components of the adhesive component of Example 2 are admixed and applied to the pretreated area of wood and the steel rod is then adhered thereto. The creosote resistant epoxy system is then cured at room temperature (~25° C.) for 48 hours. The bonded test pieces were then creosoted at 200 psi and 200° F. (~90° C.) for 6–8 hours. The load necessary to pull the steel rod under tension is designated as the pull out strength. Five samples were tested for each bonding condition and the results are set forth in Table 1.

TABLE 1

Adhesive Pull-Out Strength

| Bonding Condition | Pull-Out Strength psi | |
| --- | --- | --- |
|  | Red Oak | White oak |
| 1. Kiln dried | 1800–2000 | 1800–2000 |
| 2. 30% moisture | 600–800 | 500–700 |
| 3. 30% moisture + creosote* | 800–1000 | 700–900 |
| 4. 30% moisture + creosote* + temperature cycle** | 800–1000 | 700–900 |

*Creosoted at 200 psig and 200° F. (~90° C.) for 6–8 hrs.
**Temperature cycled for 16 hrs. @ −30° C., 1hr. @ 25° C., 6 hrs. @ 60° C., 1 hr. @ 25° C.

What is claimed is:

1. A method for bonding steel to wood comprising
   (a) preparing a low viscosity primer component (A) by admixing a resin component (a) comprising diglycidyl ether of Bisphenol A, diglycidyl ether of butanediol, and epoxy silane with a hardener component (b) comprising an aliphatic amine;
   (b) pretreating the wood by applying said low viscosity primer component thereto;
   (c) preparing an adhesive component (B) by admixing a resin component (a) comprising diglycidyl ether of Bisphenol A, a diluent, a filler, and epoxy silane; and a hardener component (b) comprising a combination of (i) an aliphatic or aromatic amine and (ii) a polyamide or an adducted amine with diglycidyl ether of Bisphenol and a filler, and wherein a flexibilizer is present in either component (a) or component (b) of said adhesive component;
   (d) applying said adhesive component to said pretreated wood;
   (e) adhering said steel to said wood; and
   (f) curing said adhesive at room temperature thereby bonding said steel to said wood.

2. A method according to claim 1 wherein said low viscosity primer component (A) comprises
   (a) a resin component comprising about 60 to about 80 wt % based upon the total weight of the resin component of diglycidyl ether of Bisphenol A; about 10 to about 40 wt % based upon the total weight of the resin component of diglycidyl ether of butanediol; and about 0.5 to about 5 wt % based upon the total weight of the resin component of epoxy silane; and
   (b) a hardener component comprising an aliphatic diamine selected from the group consisting of 2,2,4-trimethylhexanediamine, 2,4,4-trimethylhexanediamine, 2-methylpentanediamine, monoethanolamine, N-aminoethyl ethanolamine, ethylenediamine, hexamethylenediamine, trimethylhexamethylenediamine, diethylenetriamine, triethylenetetramine, tetraethylenepentamine, N,N-dimethylpropylenediamine and 1,3-N,N-diethylpropylenediamine.

3. A method according to claim 1 wherein said low viscosity primer component (A) comprises
   (a) a resin component comprising about 65 to about 70 wt % based upon the total weight of the resin component of diglycidyl ether of Bisphenol A; about 25 to about 35 wt % based upon the total weight of the resin component of diglycidyl ether of butanediol; and about 1 to about 4 wt % based upon the total weight of the resin component of epoxy silane; and
   (b) a hardener component comprising an aliphatic diamine selected from the group consisting of 2,2,4-trimethylhexanediamine or 2,4,4-trimethylhexanediamine.

4. A method according to claim 1 wherein said low viscosity primer component (A) comprises
   (a) a resin component comprising about 68 wt % based upon the total weight of the resin component of diglycidyl ether of Bisphenol A; about 29 wt % based upon the total weight of the resin component of diglycidyl ether of butanediol; and about 3 wt % based upon the total weight of the resin component of epoxy silane; and
   (b) a hardener component comprising an aliphatic diamine selected from the group consisting of 2,2,4-trimethylhexanediamine or 2,4,4-trimethylhexanediamine.

5. A method according to claim 1 wherein component (a) and component (b) of said low viscosity primer component (A) are present in a stoichiometric ratio.

6. A method according to claim 1 wherein said adhesive component (B) comprises
   (a) a resin component comprising about 40 to about 60 wt % based upon the total weight of the resin component of diglycidyl ether of Bisphenol A; about 4 to about 10 wt % based upon the total weight of the resin component of a diluent; about 25 to about 40 wt % based upon the total weight of the resin component of a filler and about 0.5 to about 3 wt % based upon the total weight of the resin component of epoxy silane; and
   (b) a hardener component comprising about 30 to about 65 wt % based upon the total weight of the hardener component of a combination of an aliphatic or aromatic amine and a polyamide or an adducted amine with diglycidyl ether of Bisphenol and about 30 to about 70 wt % based upon the total weight of the hardener component of a filler.

7. A method according to claim 1 wherein said adhesive component (B) comprises
   (a) a resin component comprising about 45 to about 55 wt % based upon the total weight of the resin component of diglycidyl ether of Bisphenol A; about 5 to about 8 wt % based upon the total weight of the resin component of a diluent; about 30 to about 35 wt % based upon the total weight of the resin component of a filler and about 1 to about 2 wt % based upon the total weight of the resin component of epoxy silane; and
   (b) a hardener component comprising about 35 to about 50 wt % based upon the total weight of the hardener component of a combination of an aliphatic or aromatic amine and a polyamide or an adducted amine with diglycidyl ether of Bisphenol and about 50 to about 65 wt % based upon the total weight of the hardener component of a filler.

8. A method according to claim 1 wherein said adhesive component (B) comprises
   (a) a resin component comprising about 50 wt % based upon the total weight of the resin component of diglycidyl ether of Bisphenol A; about 6 wt % based upon the total weight of the resin component of a diluent; about 37 wt % based upon the total weight of the resin component of a filler and about 2 wt % based upon the total weight of the resin component of epoxy silane; and
   (b) a hardener component comprising about 36 wt % based upon the total weight of the hardener component of a combination of an aliphatic or aromatic amine and a polyamide or an adducted amine with diglycidyl ether of Bisphenol and about 64 wt % based upon the total weight of the hardener component of a filler.

9. A method according to claim 1 wherein said diluent present in the resin component (a) of said adhesive component (B) is selected from the group consisting of tripropylene glycol monomethyl ether, glycidyl ether of butanediol, glycidyl ether of o-cresol, butyl glycidyl ether, $C_{12}$ and $C_{14}$ aliphatic alkyl glycidyl ether, $C_8$ alkyl glycidyl ether and $C_{10}$ alkyl glycidyl ether; and wherein said filler present in the resin component (a) of said adhesive component (B) is selected from the group consisting of silica, talc, kaolin and aluminum oxide.

10. A method according to claim 9 wherein said diluent is tripropylene glycol monoethyl ether or glycidyl ether of butanediol and said filler is silica.

11. A method according to claim 1 wherein said flexibilizer is selected from the group consisting of epoxy terminated polysulfide, adduct of diglycidyl ether of Bisphenol A with carboxyl terminated synthetic rubber and epoxy terminated polyurethanes and is present in the resin component (a) of the adhesive component (B) in an amount ranging from about 3 to about 6 wt % based upon the total weight of the resin component.

12. A method according to claim 11 wherein said flexibilizer is an epoxy terminated polysulfide.

13. A method according to claim 11 wherein said flexibilizer is present in an amount ranging from about 4 to about 5 wt % based upon the total weight of the resin component.

14. A method according to claim 11 wherein said flexibilizer is present in an amount of 5 wt % based upon the total weight of the resin component.

15. A method according to claim 11 wherein said resin component (a) of said adhesive component (B) further comprises additional multifunctional aliphatic and aromatic epoxides in an amount ranging from about 10 to about 30 wt % based upon the total weight of said resin component.

16. A method according to claim 1 wherein said hardener component (b) of said adhesive component (B) comprises a combination of
    (i) an aliphatic or an aliphatic amine selected from the group consisting 2-methylpentanediamine, triethylenetetramine, 1,3-benzene dimethanamine 2,2,4-trimethylhexanediamine and 2,4,4-trimethylhexanediamine and
    (ii) a polyamide or an adducted amine with diglycidyl ether of Bisphenol A wherein the amine is selected from the group consisting of 2-methylpentanediamine, triethylenetetramine, 1,3-benzene dimethanamine 2,2,4-trimethylhexanediamine and 2,4,4-trimethylhexanediamine; and
    a filler selected from the group consisting of silica, talc, kaolin and aluminum oxide.

17. A method according to claim 1 wherein said flexibilizer is an amine terminated synthetic rubber and is present in the hardener component (b) of the adhesive component (B) in an amount ranging from about 10 to about 20 wt % based upon the total weight of the adhesive component.

18. A method according to claim 17 wherein said flexibilizer is present in an amount ranging from about 15 to about 20 wt % based upon the total weight of the adhesive component.

19. A method according to claim 1 wherein the mix ratio of component (a) and component (b) of said adhesive component (B) is about 100 to 25 wt %.

* * * * *